United States Patent [19]

Marion

[11] 3,980,590

[45] Sept. 14, 1976

[54] RECOVERY OF PARTICULATE CARBON FROM SYNTHESIS GAS

[75] Inventor: Charles P. Marion, Mamaroneck, N.Y.

[73] Assignee: Texaco Development Corporation, New York, N.Y.

[22] Filed: Dec. 23, 1974

[21] Appl. No.: 535,605

[52] U.S. Cl. ............................ 252/373; 48/196 R; 48/197 R; 48/215; 48/212; 260/449 R; 260/449.6; 260/604 HF
[51] Int. Cl.² ......................................... C01B 2/14
[58] Field of Search ....... 252/373; 48/196 R, 197 R, 48/215, 212

[56] References Cited
UNITED STATES PATENTS

| | | | |
|---|---|---|---|
| 2,987,386 | 6/1961 | Chapman et al. | 48/196 R |
| 2,992,906 | 7/1961 | Guptill | 252/373 UX |
| 2,999,741 | 9/1961 | Dille et al. | 48/196 R |
| 3,473,903 | 10/1919 | Paull et al. | 48/212 |
| 3,846,095 | 11/1974 | Crouch | 252/373 X |
| 3,868,817 | 3/1975 | Marion et al. | 252/373 U |

*Primary Examiner*—Howard T. Mars
*Attorney, Agent, or Firm*—T. H. Whaley; C. G. Ries; Albert Brent

[57] ABSTRACT

A process for recovering particulate carbon from the effluent gas stream from a partial oxidation synthesis gas generator by scrubbing the effluent gas with water in a scrubbing zone to form a carbon-water dispersion, by mixing said dispersion in a mixing zone with liquid organic extractant comprising a mixture of the liquid organic by-products from the oxo or oxyl process, optionally in admixture with a light liquid-hydrocarbon fuel fraction, to produce a clarified water layer and a carbon-extractant dispersion, by separating and recycling said clarified water to said scrubbing zone, by separating said carbon-extractant dispersion and introducing same into a fractional-distillation zone in admixture with fresh liquid-hydrocarbon fuel feedstock, by recycling a light fraction from said distillation zone to said mixing zone as said liquid organic extractant, and by introducing a pumpable bottoms carbon slurry from said distillation zone into said synthesis-gas generator as at least a portion of the fuel.

18 Claims, 2 Drawing Figures

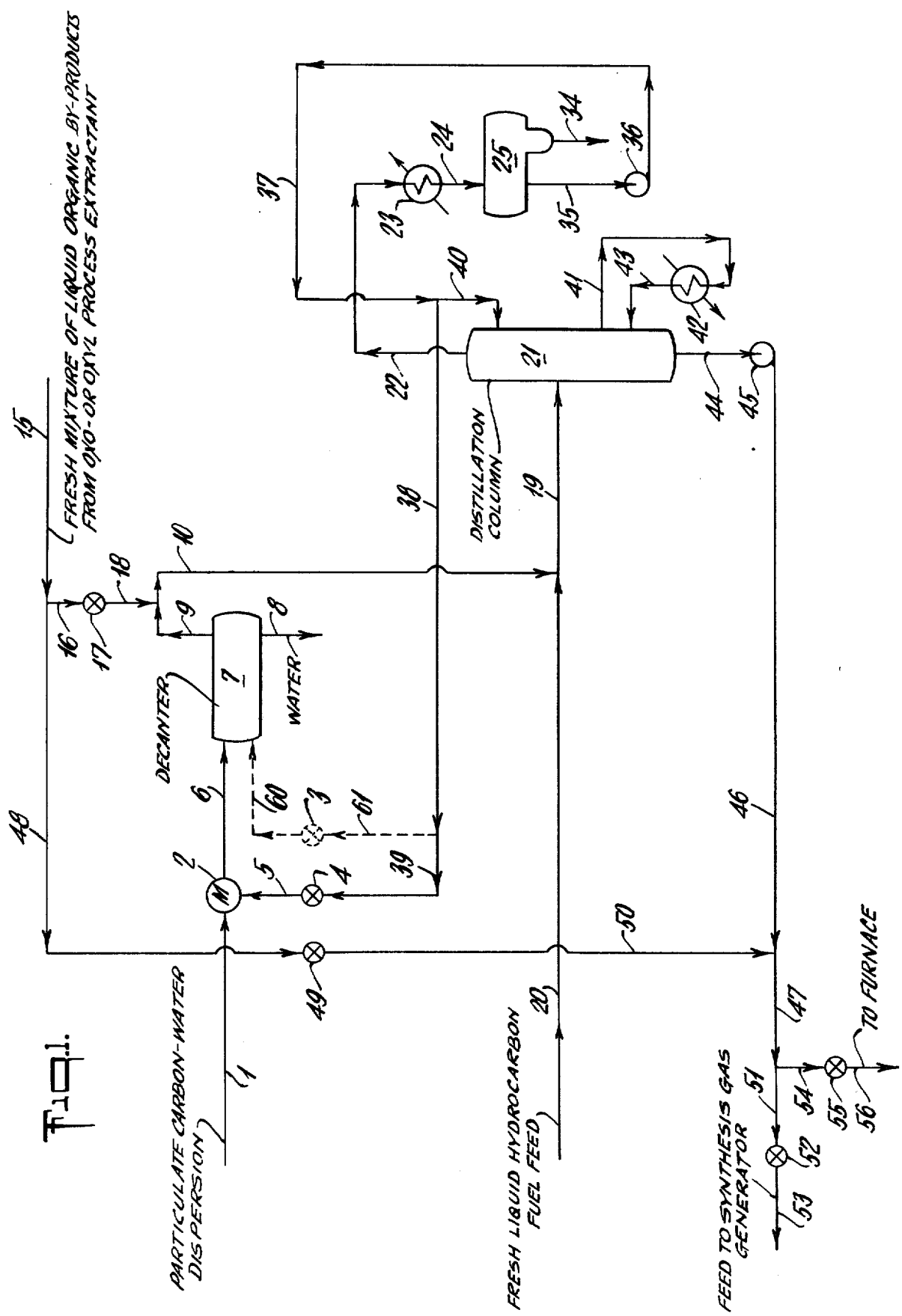

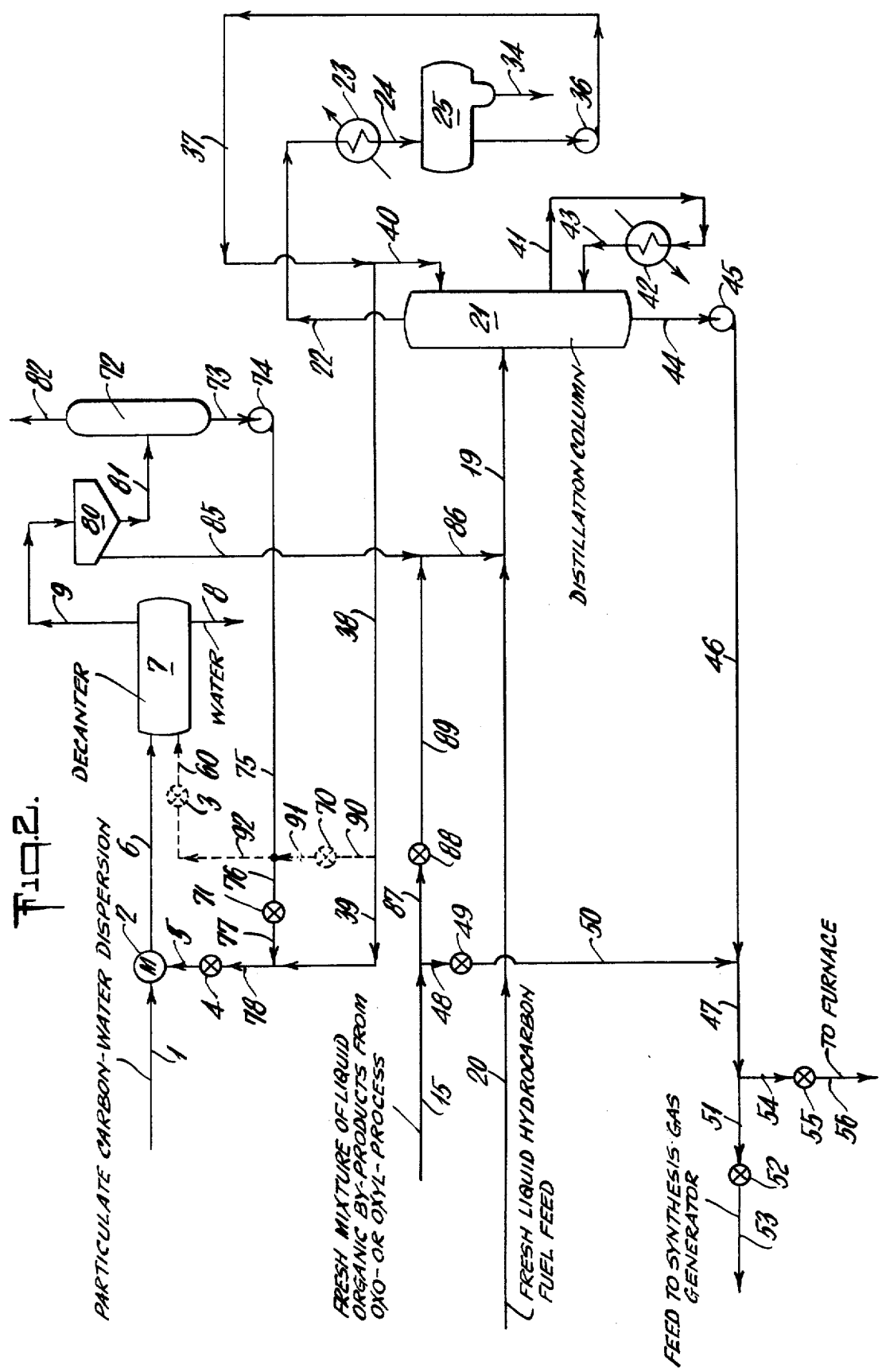

RECOVERY OF PARTICULATE CARBON FROM SYNTHESIS GAS

BACKGROUND OF THE INVENTION

1. Field of the Invention:

This invention relates to a continuous process for recovering particulate carbon from synthesis gas, and particularly from carbon-water dispersions.

2. Description of the Prior Art:

Raw synthesis gas leaving a partial oxidation synthesis gas generator comprises principally CO and $H_2$, together with minor amounts of finely divided carbon or particulate carbon. Preferably, the particulate carbon may be employed from the effluent gaseous stream by contacting the gas with water in a quenching and scrubbing zone. The finely divided carbon soot particles are wetted by water so as to form a mixture of particulate carbon and water. The particulate carbon produced in synthesis gas manufacture is unique, and problems associated with the separation of synthesis gas carbon are not the same as those encountered in the removal of carbon or solids made by other processes. For example, the fine carbon particles from partial oxidation are unusual in that they will settle in water to only about 1.0 to 3.0 weight percent, whereas conventional carbon blacks may settle to concentrations of as much as 10 weight percent.

To produce synthesis gas economically, it is important to separate clear water from the carbon-water mixture for reuse. However, the fine particle size of the carbon soot makes ordinary filtration methods difficult and makes gravity separation uneconomical because of excessive settling times, i.e. about 1-2 days. Further, liquid-hydrocarbon extraction procedures for recovering particulate-carbon soot are complex. In a prior process by R. M. Dille, et al, U.S. Pat. No. 3,147,093, a hydrocarbon oil was added to the water-carbon mixture to facilitate separation; but this operation resulted in the formation of soft aggregates of carbon curds contaminated with oil. Further, under some conditions troublesome emulsions which are difficult to separate may form upon the mixing of an oil with the carbon-water dispersion. By the process of our invention, particulate carbon, free from organic matter, is quickly and easily separated from quench and scrubbing water, so as to permit recycle of the clear water.

The oxo process is the commercial application of a chemical reaction called oxonation or, more properly, hydroformylation. In this reaction, hydrogen and carbon monoxide are added across an olefinic bond to produce aldehydes containing one more carbon atom than the olefin.

The oxyl process is a method for directly producing alcohols by catalytically reducing carbon monoxide with hydrogen so as to link several partially reduced carbon atoms together. Essentially it is a modified Fischer-Tropsch Process which preferentially produces oxygenated compounds consisting mainly of alcohols.

SUMMARY

The subject process relates to the recovery of particulate carbon from the effluent stream of synthesis gas, i.e. mixtures of $H_2$ and CO, produced by the partial oxidation of a hydrocarbonaceous fuel in a synthesis-gas generator at a temperature in the range of about 1300° to 3500°F. and at a pressure in the range of 1–300 atmospheres. The effluent gas stream from the gas generator is scrubbed with water in a scrubbing zone to produce a carbon-water dispersion. Then in a mixing zone a liquid organic extractant comprising a mixture of the liquid organic by-products from an oxo or oxyl process, optionally in admixture with a light liquid hydrocarbon fuel fraction is mixed with the carbon-water dispersion in an amount sufficient to render all of the carbon particles in said dispersion hydrophobic and to resolve said carbon-water dispersion. Next, in a separating zone, such as a decanter, a stream of clarified water and a dispersion of particulate carbon and said extractant, which dispersion floats on said clarified water layer, are separately removed. The carbon extractant dispersion is mixed with a pumpable fresh liquid-hydrocarbon fuel feedstock, e.g. fuel oil, and optionally with additional fresh mixture of liquid organic by-products from the oxo or oxyl process; and the resulting mixture is introduced into a fractional-distillation zone. A light fraction having an atmospheric boiling point in the range of about 100° to 700°F. is removed from said distillation zone, cooled, condensed, and recycled to said mixing zone as said liquid organic extractant. A pumpable liquid bottoms slurry, containing the particulate carbon from said carbon-extractant dispersion, from said distillation zone, optionally with additional fresh mixture of liquid organic by-products from the oxo or oxyl process, is introduced into said synthesis-gas generator as at least a portion of the generator feed.

Preferably, the clarified water from the decanter is recycled to said scrubbing zone after at least a portion of dissolved water-soluble constituents from said extractant are removed. Preferably, the synthesis gas is produced at the proper pressure and $H_2/CO$ mole ratio direct feeding into said oxo or oxyl process, in which said mixture of liquid organic by-products is produced to use as said liquid organic extractant. The liquid organic extractant may be added to the carbon-water slurry in one or two stages.

Optionally, by an additional step the carbon-extractant dispersion may be concentrated in a centrifuge prior to being introduced into said fractional-distillation zone in admixture with fresh liquid-hydrocarbon fuel feedstock. The comparatively clarified thin stream from the centrifuge may be recycled to said decanter and mixed with the carbon-water dispersion as said liquid organic extractant.

DESCRIPTION OF THE INVENTION

Synthesis gas comprises principally $H_2$ and CO and may contain relatively small amounts of at least one member of the group $CO_2$, $H_2O$, $CH_4$, $H_2S$, $N_2$ COS, A, particulate carbon, and fuel ash. It may be made by the partial oxidation of a hydrocarbonaceous fuel in a free-flow synthesis gas generator. For example a liquid-hydrocarbon fuel feedstock, such as fuel oil, is reacted with a free-oxygen containing gas and steam at an autogenously maintained temperature within the range of about 1300° to 3500°F. and at a pressure in the range of 1 to 300 atmospheres.

By scrubbing the effluent gas stream from the gas generator with water in a gas-scrubbing zone, particulate carbon may be removed from the gas stream as a pumpable or free-flowing carbon-water dispersion containing about 0.5 to 3 weight percent carbon. This carbon-water dispersion is then mixed with a liquid organic extractant in a mixing zone. The extractant comprises a mixture of liquid organic by-products from an oxo or oxyl process, or optionally a light liquid hydrocarbon fuel fraction in admixture with these products, to be more fully described.

The amount of liquid organic extractant is sufficient to render all of the carbon particles in the carbon-water dispersion hydrophobic and to resolve the carbon-water dispersion. As further described below, the extractant may be added in one or two stages. The total liquid organic extractant forms with the carbon from the carbon-water dispersion a pumpable carbon-extractant dispersion containing about 0.5 to 5 wt. percent carbon. A clarified water layer separates from the carbon-water dispersion in a decanter and falls to the bottom. The water layer is removed from the decanter and may be recycled to the scrubbing zone, preferably after purification by flashing to remove traces of hydrocarbons. The carbon-extractant dispersion which forms and floats on the water layer in the decanter is removed and mixed with a fresh liquid hydrocarbon fuel e.g. fuel oil and optionally with additional fresh mixture of liquid organic by-products from the oxo or oxyl process as make-up. This mixture is introduced into a fractional distillation zone. A light fraction having an atmospheric boiling point in the range of about 100° to 700°F. is removed from said distillation zone, and recylcled to said mixing zone as said liquid organic extractant. A pumpable liquid bottoms slurry containing the particulate carbon from said carbon-extractant dispersion from said distillation zone and the unvaporized portion of said liquid hydrocarbon fuel and any unvaporized portion of said mixture of liquid organic by-products from the oxo or oxyl process is introduced into said synthesis gas generator as at least a portion of said fuel. The clarified water from the separating zone is optionally purified and recycled to said gas-scrubbing zone to scrub the effluent gas stream from the gas generator.

Gaseous impurities in the effluent gas stream from the synthesis gas generator may be removed in a manner to be more fully described to produce synthesis gas e.g. mixtures of H₂+CO having a mole ratio H₂/CO in the range of about 0.9 to 2.0 moles of H₂ per mole of CO. Synthesis gas may be produced having a specific H₂/CO mole ratio for introduction into said oxo or oxyl process.

In one embodiment of the invention, the mixtures of carbon monoxide and hydrogen produced in the synthesis gas generator with a H₂/CO mole ratio in the range of about 1-2 moles of the H₂ per mole of CO are used in the well known oxo process where carbon monoxide and hydrogen are added to an olefin in the presence of a cobalt catalyst at e.g. a temperature in the range of about 100° to 200°C and a pressure in the range of about 65 to 300 atmospheres to produce an aldehyde containing one carbon atom more than the original olefin. Thus, a hydrogen atom and formyl group may be added across the double bond of an olefin as shown in equations (1) and (2):

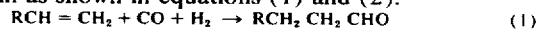
RCH = CH₂ + CO + H₂ → RCH₂ CH₂ CHO    (1)

RCH = CH₂ + CO + H₂ → RCH (CHO)CH₃    (2)

optionally, normal alcohols may be produced from the normal aldehydes by hydrogenation as shown in equation (3):

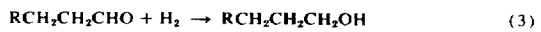
RCH₂CH₂CHO + H₂ → RCH₂CH₂CH₂OH    (3)

The oxo reaction is homogeneously catalyzed by carbonyls of groups VIII metals, iron, cobalt, nickel ruthenium, rhodium, palladium, osmium, irridium, and platinum. However, cobalt is the only metal whose carbonyl catalysts are of industrial importance e.g. Co₂(CO)₈, HCo(CO)₄, and Co₄(CO)₁₂.

Reaction times vary in the range of about 5 to 60 minutes. The synthesis gas feed to the oxo or oxyl process contains a 1-2 moles of hydrogen per mole of carbon monoxide.

Various olefinic raw materials include ethylene to produce propionaldehyde, propylene to produce butyraldehyde, and pentylenes, heptylenes, nonylenes, and dodecylenes used to produce higher oxo alcohols. Dimers and trimers of isobutylenes may be used. Straight chain products are favored over branched-chain products. For example, normal but not isobutyraldehyde can be converted into butanol or 2-ethyl-1-hexanol. Lower temperatures and higher carbon monoxide pressure favor the straight-chain isomer.

Processing steps required to produce an oxo product economically include (1) hydroformylation, or oxo reaction in an oxo reactor at a temperature in the range of about 100°-200°C. and a pressure in the range of about 65-500 atm. and preferably in the range of about 200 to 300 atm. (2) removal of catalyst from the reaction mixture (decobalting); (3) cobalt catalyst recovery and processing for reuse; (4) aldehyde product refining; and optionally, (5) hydrogenation at a temperature in the range of about 50°-250°C., and at a pressure in the range of about 50-3500 psi to produce alcohols; and (6) alcohol refining. Oxo products and by-products e.g. aldehydes, alcohols, are usually refined by conventional distillation equipment. Chemical treatment may be used to remove trace quantities of impurities.

The oxyl process as defined herein in a method for producing a mixture of oxygenated organic compounds by catalytically reducing carbon monoxide with hydrogen at a temperature in the range of about 175° to 450°C. and a pressure in the range of about 10 to 200 atmospheres. The H₂/CO ratio may be in the range of about 0.9 to 2 moles of H₂ per mole of CO. Space velocities may range from 100-500 SCF of dry feed per cu. ft. of cat. per hr. and higher based on fresh feed. Both fused and precipitated iron catalysts may be used. The iron catalyst may contain copper, calcium oxide, diatomite, and may be impregnated with potassium hydroxide. Iron nitride catalysts may be used.

The oxyl process for producing alcohols may be illustrated by Equation (IV):

2n H₂ + nCO → Cₙ H₂ₙ + ₁OH + (n−1) H₂O    (IV)

The alcohols may be subsequently converted to olefins and paraffins.

Essentially the oxyl process is a modified Fischer-Tropsch process which preferentially produces oxygenated compounds consisting mainly of alcohols. In addition to predominantly straight chain alcohols and a few side chain alcohols, by-product esters, other oxygen-containing compounds, paraffin hydrocarbons, and olefins may be produced. The olefins may be treated by the oxo process (hydroformylation followed by hydrogenation) to increase the yield of alcohols.

For example, a mixture of aliphatic oxygenated compounds containing approximately 30 percent alcohols in addition to acids, aldehydes, olefins, and esters may be produced by converting gaseous mixtures of $H_2$ + CO over alkalized iron fillings at 150 atmospheres pressure and at a temperature of 400° – 450°C.

Another oxyl process operates at a pressure in the range of about 10 to 50 atmospheres and at a temperature of about 175°–230°C. Fused-iron catalysts of the conventional ammonia-synthesis type, and high space velocities are used. Gas recycle to increase the catalyst life may be employed: 7–20 volumes of recycle gas per volume of fresh synthesis gas. Straight chain alcohols, e.g. up to $C_{12}$, may be produced by this process.

By-products as defined herein are normally liquid organic co-products formed in the hydroformylation or oxyl process and consist of liquid organic materials from the group consisting of alcohols, aldehydes, esters, ketones, ethers, acids, olefins, saturated hydrocarbons, and mixtures thereof.

A particular advantage of the subject invention is that the stream of synthesis gas may be produced in a synthesis gas generator at a proper pressure for direct use in the oxo or oxyl process, with gas purification but without gas compression. A costly gas compressor may thereby be eliminated. Also, the liquid by-products from the oxo or oxyl process, which may have previously presented a disposal problem may now be economically used as an extractant for resolving carbon-water dispersions produced in the synthesis gas scrubbing zone. Eventually, these materials are burned in the gas generator as feedstock to produce more synthesis gas.

The term "liquid organic extractant" as used herein by definition shall preferably comprise component A; optionally, component A may be in admixture with component B; wherein A comprises a mixture of liquid organic byproducts from the oxo or oxyl process comprising at least one alcohol and at least one ester in mixture with at least one other constituent and preferably two or more constituents from the group listed in Table I; and B comprises a light liquid hydrocarbon fuel fraction with an atmospheric boiling point in the range of 100° to 500°F. and a carbon number in the range of about 5 to 16. From about 0 to 33 parts by weight, and preferably less than 0.1 parts by weight of B may be present in said liquid organic extractant per part by weight of A. Also shown in Table I is the range of carbon numbers for the organic constituents. These organic compounds may have straight chains or branched structures. The specific composition of the liquid organic extractant will depend upon the reaction conditions, the type of reactants, and the procedure used to refine the product.

The term liquid organic extractant includes by definition whole samples and fractions thereof, and the raffinate after water extraction of said whole samples or fractions thereof. Preferably, the liquid organic extractant contains a minimum of water-soluble compounds. The amount of each constituent in the liquid organic extractant may be taken from the ranges shown in Table I. This includes whole samples, fractions, and the raffinate after water extraction. If a group of compounds is present, there may be more than one compound in that group present, in the extractant. For example, if the liquid organic extractant contains 65 wt. percent of normal and isoalcohols and 18 wt. percent of esters, then the total remaining constituents in the extractant cannot exceed 17 wt. percent. The term byproducts includes by definition the liquid organic waste products from the oxo or oxyl process, which have the composition shown in Tables I and II.

TABLE I

INGREDIENTS IN LIQUID ORGANIC "EXTRACTANT" Derived From Liquid Organic By-Products of Oxo or Oxyl Process Plus Light Liquid Hydrocarbon Fuel If Any

| Group | Carbon Range | Wt. % | |
|---|---|---|---|
| Alcohols | $C_3$ to $C_{16}$ | 2 | to 75 |
| Esters | $C_6$ to $C_{28}$ | 5 | to 70 |
| Aldehydes | $C_3$ to $C_{16}$ | Nil | to 25 |
| Ketones | $C_3$ to $C_{16}$ | Nil | to 25 |
| Ethers | $C_6$ to $C_{28}$ | Nil | to 50 |
| Acids | $C_2$ to $C_{16}$ | Nil | to 10 |
| Olefins | $C_5$ to $C_{15}$ | Nil | to 30 |
| Saturated Hydrocarbons | $C_5$ to $C_{28}$ | Nil | to 50 |
| Water | | Nil | to 15 |

The range of ultimate analyses of the liquid organic extractant derived from the liquid organic byproducts of the oxo or oxyl process, optionally in admixture with light liquid hydrocarbon fuel if any is shown in Table II. The elements may be taken from the ranges shown so long as the total wt. percent is 100.

TABLE II

ULTIMATE ANALYSIS OF LIQUID ORGANIC "EXTRACTANT" Derived From Liquid Organic By-Products of Oxo or Oxyl Process Plus Light Liquid Hydrocarbon Fuel If Any

| | Wt. % |
|---|---|
| Carbon | About 55 to 90 |
| Hydrogen | About 5 to 17 |
| Oxygen | About 3 to 40 |

The preferred maximum concentration of organic acid present in the extractant is less than 5 wt. percent, for example 1–2 wt. percent. For example, after the extractant is added to the carbon-water dispersion the acid content of the dispersion may be less than 15 parts per million. The organic esters are the reaction products of primary saturated alcohols and low molecular weight saturated organic acids.

The composition of a typical mixture of liquid organic by-products of an oxo process for the production of butyraldehyde, as produced for example by the process shown in Hydrocarbon Processing, Page 211, November 1969, Gulf Publishing Co., Houston, Texas is shown in Table III.

TABLE III

Composition of Typical Mixture of Liquid Organic By-Products From Oxo Process

| | Wt. % |
|---|---|
| Esters | 54 |
| Ethers | 20 |
| Aldehydes | 5 |
| Ketones | 5 |
| Acids | About 5 and below |
| Saturated hydrocarbons | About 1 and below |
| Olefins | About 1 and below |
| Saturated hydrocarbons | About 1 and below |
| n-butyl alcohol | 3.4 |
| i-butyl alcohol | 0.6 |
| Alcohol ($C_5$–$C_8$) | 3.0 |
| Water | 2 |

The esters in the aforesaid typical mixture have an average carbon number of 12 and are formed by the reaction of $C_4$ to $C_9$ alcohols and $C_3$ to $C_8$ acids. The ethers are highly branched and have an average $C_{12}$ number. The ketones have an average $C_{12}$ number, and the acids have a $C_3$–$C_5$ number. The ultimate analysis of said typical mixture is shown in Table IV.

TABLE IV

Ultimate Analysis of Typical Mixture Of Liquid Organic By-Products From Oxo Process

|  | Wt. % |
|---|---|
| Carbon | 69.2 |
| Hydrogen | 12.0 |
| Oxygen | 18.8 |

Other properties of said typical mixture are shown in Table V.

TABLE V

Properties of Typical Mixture Of Liquid Organic By-Products From Oxo Process

| Gravity, °API | 29.2 | | |
|---|---|---|---|
| Density, | 0.87 | | |
| Viscosity, | Centistokes 68°F. 4.15 | 122°F. 2.0 | |
| Distillation, ASTM Vol. %. | °F. | Vol. %. | °F. |
| IBP | 290 | 60 | 422 |
| 10 | 326 | 70 | 450 |
| 20 | 344 | 80 | 484 |
| 30 | 360 | 90 | 526 |
| 40 | 376 | 95 | 532 |
| 50 | 396 | EP | 564 |

It has been found that improved results can be obtained by using as a portion of the liquid organic extractant only a light fraction of the typical mixture described in Table III. Said typical mixture was derived from the aforesaid oxo process and was then fractionated in Hempel Flask and Fractionating Column per ASTM Test Method D285-62. A cut comprising up to 60 volume percent, for example the cut comprising up to 25 percent by volume, and preferably the cut comprising up to 10 percent by volume will give good and sharp separations of the extractant-soot mixtures from water. The preferred 10 percent by volume fraction has an initial atmospheric boiling point (i.b.p.) of about 192°F. and the 10 volume percent boiling point of about 300°F. ASTM-D285-62. The composition of the i.b.p. − 300°F. mixture is shown in Table VI.

TABLE VI

Composition of i.b.p.–300°F. Mixture Of Liquid Organic By-Products From An Oxo Process

|  | Wt. % |
|---|---|
| n-Butanol | 47.9 |
| Isobutanol | 10.9 |
| Isopropanol | 0.2 |
| Isopentanol | 1.0 |
| Isohexanol | 1.0 |
| Ketones, $C_3$–$C_5$ | 2.0 |
| Esters, $C_4$–$C_8$ | 18.0 |
| Acids, $C_3$–$C_5$ | 5.0 |
| Water | 14.0 |

Said i.b.p. − 300°F. mixture in Table VI has a gravity °API of about 35 and an ultimate analysis as shown in Table VII.

TABLE VII

Ultimate Analysis of i.b.p.–300°F. Mixture of Liquid Organic By-Products From An Oxo Process

|  | Wt. % |
|---|---|
| Carbon | 62.2 |
| Hydrogen | 11.1 |

TABLE VII-continued

Ultimate Analysis of i.b.p.–300°F. Mixture of Liquid Organic By-Products From An Oxo Process

|  | Wt. % |
|---|---|
| Oxygen | 26.7 |

There are preferably none of the following materials in the extractant: salts, sulfuric esters (sulfates), alkane or alkyl sulfonic acids, amine, amino, and ammonium compounds.

Preferably, the conventional methods e.g. flashing, extraction, distillation, and decanting, the water and water-soluble constituents are removed from said extractants prior to mixing the extractant with the carbon-water dispersion.

The synthesis gas generator in my process preferably consists of a compact, unpacked, free-flow noncatalytic, refractory lined steel pressure vessel of the type described in coassigned U.S. Pat. No. 2,809,104 issued to D. M. Strasser et.al., which patent is incorporated herewith by reference.

The free-oxygen containing gas may be selected from the group consisting of air, oxygen-enriched air (22 mole percent $O_2$ and higher), and preferably substantially pure oxygen (95 mole percent $O_2$ and higher).

Preheating of the reactants is optional but generally desirable. For example, a hydrocarbon oil and steam may be preheated to a temperature in the range of about 100° to 800°F. and the oxygen may be preheated to a temperature in the range of about 100° to 1000°F.

A wide variety of hydrocarbonaceous fuels is suitable as feedstock for the partial oxidation process, either alone, in combination with each other or with particulate carbon, and preferably in combination with a portion of the mixture of liquid organic by-products from the oxo or oxyl process. For example, a separate portion of said mixture of organic by-products from an oxo or oxyl process may be mixed with each part by weight of the bottoms product from the fractional distillation zone, to be further described. The hydrocarbonaceous feeds include fossil fuels such as: various liquid hydrocarbon fuels including petroleum distillates and residues, naphtha, gas oil, residual fuel, reduced crude, fuel oil, whole crude, coal tar oil, shale oil, tar sand oil, and mixtures thereof.

Suitable liquid hydrocarbon fuel feeds as used herein are by definition liquid hydrocarbonaceous fuel feeds that have a gravity in degrees API in the range of about −20 to 100. Pumpable slurries of solid carbonaceous fuels, i.e., lignite, bituminous and anthracite coals in water or in said liquid hydrocarbon fuels are included herewith as within the scope of the definition for hydrocarbonaceous fuel feeds. Similarly, pumpable slurries of particulate carbon soot in a carrier from the group consisting of liquid hydrocarbon fuel or residues thereof, liquid organic by-products from an oxo or oxyl process or residues thereof, and mixtures thereof are also by definition hydrocarbonaceous fuels.

It is normal to produce from hydrocarbonaceous fuel feeds by partial oxidation about 0.5 to 20 weight percent of free carbon soot (on the basis of carbon in the hydrocarbonaceous fuel feed). The free carbon soot is produced in the reaction zone of the gas generator for example, by cracking hydrocarbonaceous fuel feeds. Carbon soot will prevent damage to the refractory lining in the generator by constituents which are present as ash components in residual oils. With heavy crude or fuel oils it is preferable to leave about 1 to 3 weight percent of the carbon in the feed as free carbon soot in the product gas. With lighter distillate oils, progressively lower carbon soot yields are maintained.

The amount of soot in the product synthesis gas may be controlled primarily by regulating the oxygen to carbon ratio (O/C, atom/atom) in the range of 0.7 to 1.5 atoms of oxygen per atom of carbon in the feed and, to some extent by regulating the weight ratio of $H_2O$ to hydrocarbonaceous fuel feed in the range of 0.15 to 3.0 pounds of $H_2O$ per pound of fuel. In the above relationship, the O/C ratio is to be based upon (1) the total of free-oxygen atoms in the oxidant stream plus combined oxygen atoms in the hydrocarbonaceous fuel feed molecules and (2) the total of carbon atoms in the hydrocarbonaceous fuel feed plus carbon atoms in recycled particulate carbon (soot). Since the oxo and oxyl by-products contain combined oxygen atoms, the requirement of free-oxygen for gasification is less than for ordinary hydrocarbons. In fact, there is a synergistic effect leading to even lower oxygen consumption then would be expected according to direct proportionality. At a constant oil feed rate, the entire operating range of about 1 percent to about 4 percent soot yield may be obtained by only a 6 percent change in the oxygen feed rate.

$H_2O$ is principally introduced into the reaction zone to help control the reaction temperature, to act as a dispersant of the hydrocarbonaceous fuel fed to the reaction zone, and to serve as a reactant to increase the relative amount of hydrogen produced. Other temperature moderators include $CO_2$-rich gas, a cooled portion of product gas, cooled off-gas from an integrated ore-reduction zone, nitrogen, and mixtures thereof.

Many advantages are achieved in the subject process by the addition of oxygen containing hydrocarbon material, such as found in the liquid organic extractant, as a portion of the feed to the gas generator. For example, for a given level of soot production, the amount of free-oxygen supplied to the reaction zone of the synthesis gas generator, and the steam to fuel weight ratio may be decreased at a substantial cost savings.

The free-carbon soot leaving the reaction zone entrained in the stream of product synthesis gas has some unique properties. It is both hydrophilic and oleophilic. It is easily dispersed in water and has a high surface area. For example, the specific surface area of the free carbon soot, as determined by nitrogen absorption, ranges from 100 to 1,200 square meters per gram. The Oil Absorption Number, which is a measurement of the amount of linseed oil required to wet a given weight of carbon soot, ranges from 1.5 to 5 cc's of oil per gram of carbon soot. For further information regarding the test method of determining the Oil Absorption Number see ASTM Method D-281.

Free carbon soot, also referred to herein as particulate carbon, as produced within our process has a particle diameter in the range of about 0.01 to 0.5 microns and commonly has a particle diameter of about 77 millimicrons. Free-carbon soot comprises about 92 to 94 weight percent of carbon, 1 to 4 weight percent of sulfur, and 3 to 5 weight percent of ash. Being formed at high temperatures, it is substantially free from volatile matter.

In one embodiment of our invention, the hot gaseous effluent from the reaction zone of the synthesis gas generator may be quickly cooled below the reaction temperature to a temperature in the range of 180° to 700°F. by direct quenching in water in a gas-liquid contacting or quenching zone. For example, the cooling water may be contained in a carbon-steel quench vessel or chamber located immediately downstream from the reaction zone of said gas generator. A large diameter dip leg starting at the bottom end of the reaction zone and discharging beneath the water level in the quench chamber serves as an interconnecting passage between the reaction zone and the quench zone through which the hot product gases pass. This passage also serves substantially to equalize the pressure in the two zones. A concentric draft tube, open on both ends, surrounds said dip leg. An annulus is created through which a mixture of quenched gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone.

Recycle water from the carbon-scrubbing zone, to be further described, is normally introduced through a quench ring at the top of the dip-leg to cool the metal at that point. Large quantities of steam are generated in the quench vessel, and the quench chamber may be likened to a high output high pressure boiler.

The turbulent condition in the quench chamber, caused by the large volume of gases bubbling up through said annular space, helps the water to scrub a large part of the solids from the effluent gas so as to form a dispersion of unconverted particulate carbon and quench water. Further, steam required for any subsequent shift conversion step is picked up by the effluent synthesis gas during quenching. For a detailed description of the quench chamber, reference is made to coassigned U.S. Pat. No. 2,896,927 issued to R. E. Nagle et.al., which is herewith incorporated by reference. Any residual solids in the cooled and scrubbed effluent synthesis gas leaving the quench chamber may be removed by means of a conventional venturi or jet scrubber, such as described in Perry's Chemical Engineers' Handbook, Fourth Edition, McGraw-Hill Co., 1963, pages 18–55 to 56.

Alternately, the hot effluent gas stream from the reaction zone of the synthesis gas generator may be cooled to a temperature in the range of about 240° to 700°F. by indirect heat exchange in a waste heat boiler. The entrained solid particles may be then scrubbed from the effluent synthesis gas by contacting and further cooling the effluent stream of synthesis gas with quench water in a gas-liquid contact apparatus, for example, a quench dip-leg assembly, a spray tower, venturi, or jet scrubber, bubble plate contactor, packed column, or in a combination of said equipment. For a detailed description of cooling synthesis gas by means of a waste heat boiler and a scrubbing tower, reference is made to coassigned U.S. Pat. No. 2,980,523 issued to R. M. Dille et.al. and incorporated herewith by reference.

It is desirable to maintain the concentration of particulate carbon in the gas cooling and scrubbing water streams in the range of about 0.5 to 2 wt. percent and preferably below about 1.5 wt. percent. In this manner, the dispersion of carbon in water will be maintained sufficiently fluid for easy pumping through pipelines and for further processing.

The temperature in the scrubbing zone is in the range of about 180° to 700°F., and preferably in the range of about 250°–550°F. The pressure in the scrubbing zone is in the range of about 1–250 atmospheres, and preferably at least 25 atmospheres. Suitably the pressure in the scrubbing zone is about the same as that in the gas generator, less ordinary pressure drop in the lines.

It is important with respect to the economics of the process that the particulate carbon be removed from the carbon-water dispersion and the resulting clear water to be recycled and reused for cooling and scrubbing additional particulate carbon from the synthesis gas.

In the subject process the previously described liquid organic extractant comprising a mixture of liquid organic by-products from the oxo or oxyl process is used to resolve the carbon-water dispersion so as to separate the water from the carbon. In single stage extraction the total amount of weight of said liquid organic extractant that is mixed with said carbon-water dispersion in a mixing zone is in the range of about 10 to 200 times, and preferably in the range of about 20 to 100 times the weight of the particulate carbon in the carbon-water dispersion. This amount is sufficient to render all of said particulate carbon hydrophobic and to resolve the carbon-water dispersion. Clarified water separates from the particulate carbon and a carbon-extractant dispersion is produced.

The carbon-water dispersion may be contacted with said liquid extractant by any suitable means e.g. mixing valve, static mixer, baffled mixer, pump, orifice, nozzle, propeller mixer, or turbine mixer. High pressure will make possible the use of an extractant containing lower boiling constituents. High temperature facilitates phase separation.

The mixed stream is passed into a phase-separation zone, for example a decanter or tank providing a relatively quiescent settling zone. In the separating zone, also known as a decanter, clarified water falls to the bottom by gravity. A dispersion of carbon in said extractant may float on top of the clarified water. The volume of the settling tank should be sufficient to provide a suitable residence time preferably of at least two minutes, and usually in the range of about 5 to 15 minutes.

The pressure in the settling zone or decanter should be sufficient to maintain both the extractant and the water in liquid phase, e.g. 5 to 250 atmospheres depending upon the temperature. The temperature, in the decanter will be substantially that of the carbon-water dispersion leaving the scrubbing zone e.g. 180°–700°F., and preferably in the range of about 250°–550°F.

Clarified water is removed from the decanter, and at least a portion in admixture with fresh water may be recycled to the scrubbing zone. Optionally, at least a portion of any dissolved water-soluble constituents from the extractant may be removed from the clarified water by suitable means before the water is recycled to the scrubbing zone. For example, the clarified water stream may be introduced into a gas-liquid separation zone where the pressure is suddenly dropped. A light gaseous fraction is flashed off which is cooled below the dew point to separate uncondensed light gases, water, and water-soluble oxygen containing liquid organic compounds. Clarified water is removed from the separation zone and recycled to the mixing zone.

A pumpable dispersion of particulate carbon in extractant containing about 0.5 to 5 wt. percent carbon, and preferably about 0.5 to 3 wt. percent carbon is produced. About 0.02 to 40 lbs. and preferably about 0.1 to 10 lbs. of a fresh liquid hydrocarbon fuel are mixed with each lb. of extractant in said carbon-extractant dispersion.

The amount of fresh liquid hydrocarbon fuel, as previously described, is kept to a minimum. This amount should be sufficient only to form a pumpable bottoms slurry with the particulate carbon from said carbon-extractant dispersion in a subsequent fractional distillation zone. The aforesaid pumpable bottoms slurry may have a carbon content of about 0.5 to 25 wt. percent and preferably 4 to 8 wt. percent.

Optionally, about 0 to 0.25 lbs. of additional mixture of liquid organic by-products frm an oxo or oxyl process may be introduced into the system as make-up and mixed with each lb. of carbon-extractant dispersion plus liquid hydrocarbon fuel. The mixture of fluids is preferably preheated to a temperature in the range of about 200° to 600°F. and introduced into a fractional distillation column. A light fraction having an atmospheric boiling point in the range of about 100° to 700°F., such as in the range of about 150° to 600°F., is removed overhead from the distillation tower.

A suitable pressure in the distillation tower may be in the range of about 14.7 to 100 psig. Normally, conditions of temperature and pressure in said distillation column are such that substantially no fractionation of the fresh liquid hydrocarbon fuel takes place. In such instance the overhead light fraction from the distillation column substantially comprises said mixture of liquid organic by-products from the oxo or oxyl process which then solely comprises said liquid organic extractant. For example in such case, the atmospheric boiling point of the overhead light fraction stream may be in the range of about 150° to 700°F. and the pressure may be in the range of about 14.7 to 100 psig. However, in other embodiments the distillation column may be operated so that the overhead fraction includes 0.1 to 25 weight percent of light liquid hydrocarbon fuel and the remainder a mixture of liquid organic by-products of oxo or oxyl process. The light liquid hydrocarbon fuel are liquid hydrocarbon fuels having gravities of 20° API and higher, for example butanes, pentanes, hexanes, benzol, toluol, natural gasoline, gasoline, naphtha, gas oil, their mixtures and the like. The light fraction which is recycled to said mixing zone as said previously described liquid organic extractant may have the composition shown in Tables I and II.

The bottoms stream from the distillation column comprises a pumpable slurry comprising in wt. percent about 50 to 99.5 unvaporized portion of said liquid hydrocarbon fuel, about 0.5 to 25 of particulate carbon removed from said carbon-extractant dispersion, and about 0 to 25 of unvaporized portion of the mixture of liquid organic by-products from the oxo or oxyl process used in make-up. This stream is introduced into the synthesis gas generator as at least a portion of the fuel. Optionally about 0 to 100 parts by weight of additional mixture of liquid organic by-products from the oxo or oxyl process may be mixed with each part by weight of the aforesaid slurry. Further, these fuel streams may be preheated to a temperature in the range of about 100° to 800°F. They may be introduced into the gas generator in liquid phase or vapor phase, and may be in admixture with $H_2O$. A portion of this fuel mixture may be, optionally, introduced into a furnace as fuel.

In a separate embodiment to be further described, the aforesaid single-stage decanter is combined with a centrifugal separator that further concentrates the carbon-extractant dispersion.

Another embodiment of the invention involves simultaneous additions of liquid organic extractant in two stages. Thus in the first stage, the aforesaid carbon-water dispersion is resolved into a clarified water layer and a dry carbon powder which floats on the clarified water. This may be accomplished by adding the liquid organic extractant to the carbon-water dispersion in an amount just sufficient to render all of the carbon hydrophobic but insufficient to produce a carbon-extractant dispersion at this stage. As a result of this smaller amount extractant, the carbon separates rapidly and substantially completely from the water and floats to the surface of the clarified water layer as a dry-appearing, partially agglomerated soot.

The amount of liquid organic extractant to be added may be obtained experimentally by shake tests. Small increments of extractant are added to the carbon-water dispersion until the carbon separates rapidly and floats on the surface of the clarified water. Thus when the water phase is clear and the carbon is "dry" and fluffy, the amount of extractant is optimum. The amount of extractant added in the first stage will usually fall within the range of 1–3 times the Oil Absorption No. of the particulate carbon in the carbon-water dispersion. This amount may range between about 1.5 – 10 lbs. of extractant per lb. of carbon or more likely in the range of about 3 to below 6.

In the second stage the particulate carbon is floated off the surface of the clarified water layer in the decanter by introducing a horizontal stream of additional liquid extractant into said decanter at or near the interface between said clarified water layer and said particulate carbon.

A sweeping action across the interface will also disperse the carbon in the extractant. The extractant in the first and second stages may have the same or different constituents. However any extractant used conforms to those previously described - see Tables I to VII.

The principal advantage of the two-stage addition lies in the avoidance of the formation of emulsions. In the first stage, the carbon-water dispersion is resolved and the carbon floats to the surface of the water with the addition of a minimum of extractant. The secondary liquid organic extractant is then added in much larger amounts with a minimum of mixing with the water so that emulsion formation is avoided even if emulsifying agents are present.

The amount of liquid organic extractant that is introduced in the second stage is sufficient to form a carbon-extractant dispersion containing about 0.5 to 5 wt. percent carbon in the total extractant. This amount may be about ten times the amount of extractant that was used in the first stage. The clarified water is removed from the decanter in the manner described previously.

In another embodiment of my invention by means of a conventional industrial centrifuge, the carbon-extractant dispersion from the decanter having a solid content in the range of about 0.5 to 5 wt. percent may be separated into a thick stream and a comparatively clean stream of carbon-water. The temperature in the centrifuging zone may be in the range of about ambient to 700°F and the pressure may be in the range of about 1 to 200 atmospheres. The thick stream may have a carbon content in the range of about 1 to 10 wt. percent and suitably about 4 to 7 wt. percent. The thin centrifuge stream may have a carbon content in the range of about 0.02 to 1 wt. percent, and suitably about 0.1 to 0.5. The thick stream of carbon-extractant is then passed into the fractional distillation column in admixture with fresh liquid hydrocarbon fuel, as previously described. This pumpable mixture may comprise about 0.02 to 40 lbs. of fresh liquid hydrocarbon fuel per lb. of extractant in the thick centrifuge stream. Optionally, the thick stream may be mixed with about 0 to 25 wt. percent of fresh mixture of liquid organic by-products from the oxo or oxyl process as described in Tables I to VII.

The comparatively clean thin centrifuge stream of carbon-extractant may be passed into a hold-up tank where any waste gas is removed. A portion of the thin stream may be then recycled to the decanter for introduction as the second extractant in the second stage. A portion of the light fraction from the distillation column may supplement the thin centrifuge stream. Alternately, this thin stream may be used as the first stage extractant and the light fraction from the distillation zone may be used as the second stage extractant. Alternately, in a single stage decanter, about 0 to about 1 parts by weight of this thin stream may be mixed with each part by weight of that portion of the light fraction from said distillation zone that may be used as the extractant to comprise the aforesaid liquid organic extractant. Clean water is removed from the bottom of the decanter and recycled to the carbon scrubbing zone. Preferably, at least a portion of the dissolved water soluble constitutents of the extractant may be removed from the water.

Although the process of the invention is particularly suitable for removing substantially all of the dispersed particulate carbon from a carbon-water dispersion produced by water scrubbing the effluent gaseous stream from the partial oxidation process, it may be similarly used in many other hydrocarbon gasification processes.

DESCRIPTION OF THE DRAWING AND EXAMPLES

A more complete understanding of the invention may be had by reference to the accompanying schematic drawing which shows in FIG. 1 the previously described process in detail. Quantities have been assigned to the various streams on an hourly basis so that the following description in Example I may also serve as an example of the subject continuous process.

EXAMPLE I

In this embodiment of the process, the decanter is operated in a single stage. With reference to FIG. 1 of the drawing, on an hourly basis about 14,400 lbs. of a particulate carbon-water dispersion at a temperature of about 250°F. and containing about 144 lbs. of particulate carbon from the gas scrubbing zone of a process for making synthesis gas by the partial oxidation of a hydrocarbonaceous fuel to be further described are passed through line 1 into mixer valve 2. With valve 3 closed and valve 4 open, said carbon-water dispersion is mixed in mixer 2 with about 9216 lbs. of a liquid organic extractant from line 5. The liquid extractant in line 5 comprises a portion of the light overhead fraction produced in fractional-distillation column 21, to be further described.

About 496,000 standard cubic feet of the aforesaid dry synthesis gas are produced by the partial oxidation of said hydrocarbonaceous fuel in a free-flow noncatalytic synthesis gas generator (not shown) with 10,183 lbs. of pure oxygen (in a 99.5 mole percent $O_2$ stream) and 4395 lbs. of steam at a temperature of about 2400°F. and at a pressure of about 38 atmospheres. The composition of the synthesis gas follows in mole percent: CO 41.00, $H_2$ 42.22, $CO_2$ 4.39, $H_2O$ 11.26, $CH_4$ 0.21, A 0.11, $N_2$ 0.12, $H_2S$ 0.66 and COS 0.03. After purification as previously described to remove acid gases and particulate carbon, the synthesis gas is compressed and introduced into an oxo process (not shown), for example, to produce n-butyraldehyde by the hydroformylation of propylene in the presence of cobalt catalyst at a temperature in the range of about 130°–175°C. and a pressure of about 200 atmospheres.

The liquid organic extractant in line 5 is a mixture of liquid organic by-products from said oxo process, having the composition shown in Table III and the Ultimate Analyses shown in Table IV with substantially all of the water-soluble compounds removed.

The mixture of liquid organic extractant and carbon-water is passed through line 6 into decanter 7. A relatively quiescent volume is provided in the settling zone at a pressure of about 125 atmospheres. Substantially clear water, containing any water-soluble constituents from said liquid organic extractant, settles by gravity to the bottom of decanter 7 and is removed by way of line 8. Preferably, the water in line 8 may be purified by conventional means and then recycled to the gas cooling and scrubbing zone. A portion may be discharged from the system and replaced with fresh water. 9360 lbs. of a dispersion of particulate carbon and said liquid organic extractant, containing a small amount of water and about 144 lbs. of carbon are removed near the top of decanter 7 by way of line 9. This stream of carbon-extractant dispersion is passed into line 10 where it may be optionally mixed with fresh liquid organic extractant from lines 15–16, valve 17, and line 18. Then in line 19 about 8172 lbs. of fresh heavy liquid hydrocarbon fuel, such as heavy fuel oil from line 20 are mixed with the carbon-extractant mixture from line 10. The heavy fuel oil from line 20 has the following characteristics: 19.6°API, Ultimate Analysis, Wt. % C 81.2, H 11.4, O, N 0.5, S 3.3, O 3.5 and ash 0.2, and Gross Heating Value 17,814 BTU per lb. The mixture of fluids in line 19 is passed into fractional distillation column 21.

About 11,757 lbs. of a light fraction stream are removed from fractional-distillation tower 21 by way of line 22. This stream is cooled and liquefied by being passed through heat exchanger 23. The liquid stream is passed through line 24 into liquid-liquid separator 25 where any water may be separated and removed by way of line 34. The liquid light fraction is removed through line 35 and recycled by means of pump 36 and line 37. 9216 lbs. of this light liquid fraction is recycled to mixing zone 2 by way of lines 38–39, valve 4, and line 5, as the previously described liquid organic extractant. The remainder of the light fraction stream is recycled through line 40 into fractional distillation column 21.

A slip stream is removed from distillation column 21 and recycled through line 41, reboiler 42, and line 43 into distillation column 21.

About 8271 lbs. of a pumpable bottoms slurry stream essentially comprising the remaining unvaporized fraction of said heavy fuel oil liquid hydrocarbon fuel from line 20 plus the particulate carbon from said carbon-extractant dispersion from line 9 are removed from distillation column 21 by way of line 44. In this example, substantially all of the liquid organic extractant charged to the distillation column is vaporized. Accordingly, substantially no residue mixture of liquid organic by-products from the oxo process leaves the distillation column with the bottoms slurry. Pump 45 passes the bottoms slurry stream through line 46, and into line 47 where it is mixed with about 1767 lbs. of said fresh mixture of liquid organic by-products from said oxo process coming through lines 15 and 48, valve 49, and line 50. The carbon-extractant-oil mixture in line 47 may be passed through line 51, valve 52, and line 53 into the aforesaid synthesis gas generator as at least a portion of the feed. Optionally, a portion of the mixture in line 47 may be passed through line 54, valve 55, and line 56 and burned in a furnace (not shown) as fuel. It is desirable to operate the decanter at a pressure below that of the gas generator, with allowance for pressure drop in the lines and equipment.

EXAMPLE II

This example pertains to that embodiment of the subject invention by which two separate additions of liquid extractant of the type described in Example I are made.

Example II is similar to the process in Example I, but provides for the two-stage addition of liquid organic extractant to the decanter. With reference to FIG. 1 of the drawing, in the first stage with both valves 3 and 4 open 432 lbs. of liquid organic extractant from line 5 are mixed in mixer 2 with 14,400 lbs. of carbon-water dispersion from line 1. The liquid organic extractant in line 5 is a portion of the light liquid overhead fraction from distillation zone 21 which is passed through lines 38, 39, and 5. The mixture from 2 is passed through line 6 and into decanter 7 in the manner described previously in Example 1. However, the amount of liquid extractant added in the first stage is sufficient only to render all of the carbon in the dispersion hydrophobic. The carbon rises to the top of the decanter and floats on the clarified water layer as a dry powder. The decanter is at a pressure of about 25 atmospheres.

From line 60 a second portion of the overhead liquid fraction from distillation zone 21 in the amount of about 8,784 lbs. are introduced simultaneously into decanter 7. The second portion of extractant is passed through lines 38, 61, and line 60 into decanter 7. The extractant is introduced into the decanter at the interface between the carbon and the surface of the clarified water layer. By this means the particulate carbon may be floated off the surface of the clarified water layer in the decanter and a carbon-extractant dispersion is produced. The carbon-extractant dispersion is resolved in the manner described previously in Example I, by introducing said carbon-extractant dispersion into distillation column 21 in admixture with said fresh heavy fuel oil from line 11. Bottoms water is removed from the decanter and optionally purified by removing at least a portion of any dissolved water soluble constituents of said extractant. The water is then recycled to the gas scrubbing zone to produce more carbon-water dispersion. The rest of the process is substantially the same as Example I.

EXAMPLE III

In this embodiment of the invention the liquid organic extractant is introduced in one stage and the carbon-extractant dispersion from the decanter is concentrated by means of a centrifuge. The composition of the liquid organic extractant is the same as that described in Example I. The synthesis gas produced has the same composition as shown in Example I and is scrubbed with water to remove entrained particulate carbon and purified to remove acid gases. The mixture of CO + $H_2$ is then introduced into the oxo process as described in Example I.

With reference to FIG. 2 of the drawing, on an hourly basis about 14,400 lbs. of a particulate carbon-water dispersion at a temperature of about 250°F. and containing about 144 lbs. of particulate carbon from the previously described gas scrubbing zone of the process for making synthesis gas by the partial oxidation of a hydrocarbonaceous fuel as described in Example I are passed through line 1 into mixer valve 2 where it is mixed with 10,727 lbs. of said liquid organic extractant from line 5. With valves 3 and 70 closed and 71 and 4 open said liquid organic extractant in line 5 comprises 7847 lbs. of thin centrifuge stream from holding tank 72, line 73, pump 74, and lines 75–78 in admixture with 2,880 lbs. of the light overhead fraction from distillation column 21 comprising a mixture of liquid organic by-products from said oxo process which is supplied via lines 38, 39, and 78.

The mixture of extractant and carbon-water is passed through line 6 into a phase separating zone i.e. decanter 7. A relatively quiescent volume is provided in the settling zone at a pressure of about 25 atmospheres. Substantially clear water containing any dissolved water-soluble constituents of said liquid organic extractant settles by gravity to the bottom decanter 7 and is removed by way of line 8. Preferably, the water in line 7 may be purified by conventional means to remove any dissolved water-soluble constituents from the extractant, and then recycled to the synthesis gas cooling and scrubbing zone. A portion of this water may be discharged from the system and replaced by fresh water. By this means 10,727 lbs. of extractant containing at least 144 pounds of soot may be removed from the decanter through line 9. This stream is charged into a conventional centrifuge 80. The centrifuging speed corresponds to about 9500 revolutions per minute.

About 7817 lbs. of said liquid organic extractant in the thin centrifuge stream are removed from centrifuge 80 by way of line 81 and are introduced into holding tank 72. Waste gas is discharged from the system through line 82 to flare. The dispersion of particulate carbon and extractant is removed through line 73 and pumped by pump 74 into mixer 2 as a portion of said liquid organic extractant, as previously described.

A thick centrifuge slurry stream comprising about 144 lbs. of particulate carbon and about 2880 lbs. of said liquid organic extractant is removed from centrifuge 80 by way of line 85. This slurry stream may be mixed in line 86 with fresh mixture of liquid organic by-products of said oxo process as previously described, which is introduced into the system by way of lines 15, 87, valve 88, and line 89. This mixture is then mixed in line 19 with 8172 lbs. of fresh liquid hydrocarbon fuel feedstock e.g. heavy fuel oil as previously described, which is introduced into the system through line 20, and then passed into distillation zone 21.

The operating conditions of distillation column 21 in this example are such that substantially none of the heavy liquid hydrocarbon fuel feed from line 20 that is charged to the column as a portion of the feed is removed as a portion of the overhead light fraction. Thus substantially all of said heavy liquid hydrocarbon fuel passes out of the bottom of column 21 as a pumpable carbon slurry through line 44 containing 144 lbs. of carbon and substantially no unvaporized residue from said mixture of liquid organic by-products of the oxo process. The pressure in the distillation column is about one atmosphere.

About 3606 lbs. of liquid organic extractant in distillation column 21 are vaporized and passed overhead as a carbon-free vapor stream through line 22. This stream is then cooled and condensed in heat exchanger 23 and passed through line 24 into liquid-liquid separator 25. Any water may be drawn off through line 34 and the liquid organic extractant is pumped by means of pump 36 into line 37. About 2880 lbs. of the liquid organic extractant is passed through lines 38, 39, 78, and 5 into mixing zone 2 as previously described. The remainder of the liquid stream from line 37 is recycled through line 40 into fractionation column 21. Recycle ratio for distillation column 21 may range for example from 0.05 to 0.5 parts by weight of reflux per part by weight of column feed.

A slip stream is removed from column 21 by way of line 41 and passed through reboiler 42 where the temperature is raised to the desired temperature for vaporizing the overhead fraction, and then recycled to column 21 through line 43.

About 8316 lbs. of the bottoms carbon-oil slurry in line 44 containing about 144 lbs. of carbon, may be pumped by means of pump 45 into the reaction zone of said synthesis gas generator as at least a portion of the feed. Preferably, the bottoms slurry may be pumped through line 46, into line 47 where it may be mixed with about 1767 lbs. of fresh mixture of liquid organic by-products from the oxo process which enters through lines 15, 48, valve 49 and line 50. The mixture in line 47 may be passed through line 51, valve 52, and line 53 into said synthesis gas generator as at least a portion of the feed.

Optionally, a portion of the mixture of fluids in line 47 may be introduced into a furnace (not shown) as fuel, by way of line 54, valve 55, and line 56.

EXAMPLE IV

In this embodiment of the invention, decanter 7 is operated in two-stages to improve performance. Aside from this change, the rest of the process is substantially the same as that described previously in Example III.

With reference to FIG. 2 of the drawing on an hourly basis, in the first stage of the two-stage decanter operation with valve 71 closed and valves 4, 70 and 3 open about 432 lbs. of the mixture of carbon-free liquid organic by-products from said oxo process obtained as a portion of the overhead fraction from distillation column 21, are introduced into mixer 2 by way of lines 38, 39, 78 and 5 along with 14,400 lbs. carbon water dispersion containing 144 lbs. of particulate carbon from line 1. This amount of liquid extractant is sufficient to render the particulate carbon hydrophobic and to release substantially dry powdered carbon. In the second stage of the continuous decanter operation, simultaneously about 10,295 lbs. of a carbon-extractant dispersion from line 60 are introduced into the decanter near the carbon water interface to float off the carbon particles and to form the carbon-liquid organic extractant dispersion which is withdrawn through line 9. The liquid extractant in line 60 comprises 2880 lbs. of said mixture of liquid organic by-products of said oxo process obtained from distillation column 21 via lines 38, 90, valve 70, lines 91–92 and valve 3, and about 7847 lbs. of the thin centrifuge steam which contains carbon from line 73, pump 74, lines 75, 92 and valve 3. Optionally, either the thin centrifuge stream 75 or the light liquid fraction in line 38 from distillation column 2, with or without admixture with the other stream may be introduced into the first stage, the second stage, or both as at least a portion of said liquid organic extractant.

Obviously, various modification of the invention as herein set forth may be made without departing from the spirit and scope thereof and therefore, only such limitations should be made as are indicated in the appended claims.

I claim:

1. In a process for the production of gaseous mixtures comprising $H_2$ and CO by the partial oxidation of a hydrocarbonaceous fuel or a slurry of solid carbonaceous fossil fuel with a free-oxygen containing gas in the reaction zone of the free-flow noncatalytic gas generator at a temperature in the range of about 1300° to 3500°F and a pressure in the range of about 1 to 300 atmospheres in the presence of a temperature moderator to produce an effluent gas stream comprising $H_2$ and CO, and containing entrained particulate carbon and at least one member of the group $CO_2$, $H_2O$, $CH_4$, $N_2$, A, COS, and $H_2S$, and from which effluent gas stream said carbon particles are removed by scrubbing with water in a gas-scrubbing zone to produce a carbon-water dispersion, the improved method of separating particulate carbon from said carbon-water dispersion which comprises:

1. contacting said carbon-water dispersion with a liquid organic extractant comprising a mixture of the liquid organic by-products from an oxo or oxyl process comprising at least one alcohol and at least one ester in admixture with at least one constituent selected from the group consisting of aldehydes, ketones, ethers, acids, olefins, saturated hydrocarbons, and water, in admixture with 0 to 25 weight percent of a light liquid hydrocarbon fuel having a gravity in degrees API of 20° and higher and a carbon number in the range of about 5 to 16, wherein the amount of liquid organic extractant introduced is sufficient to render all of the carbon particles in said carbon-water dispersion hydrophobic and to resolve said carbon-water dispersion, and by decanting, removing a stream of clarified water and a separate stream of pumpable carbon-extractant dispersion having a carbon content of about 0.5 to 5 weight percent from a separating zone at a temperature in the range of 180°–700°F and a sufficient pressure to maintain said liquid organic extractant and said clarified water in liquid phase;
  2. mixing the carbon-extractant dispersion from (1) with liquid hydrocarbon fuel having a gravity in degrees API in the range of about −20 to 100 and in the amount of about 0.02 to 40 lbs. of fresh liquid hydrocarbon fuel per lb. of extractant in said carbon-extractant dispersion, and with about 0 to 0.25 lbs. of said mixture of the liquid organic by-products from the oxo or oxyl process per lb. of said carbon-extractant dispersion plus liquid hydrocarbon fuel, and introducing said mixture into a fractional distillation zone, removing a light fraction from said distillation zone and introducing same into (1) as at least a portion of said liquid organic extractant, removing a pumpable bottoms slurry containing said particulate carbon and the unvaporized portion of said liquid hydrocarbon fuel and any unvaporized portion of said mixture of the liquid organic by-products from the oxo or oxyl process from said distillation zone and introducing same into said gas generator as at least a portion of said fuel, and recycling said clarified water from (1), to said gas-scrubbing zone to scrub the effluent gas stream from the gas generator.

2. The process of claim 1 provided with the additional steps of expanding and dropping the pressure of the clarified water from step (1), and in a gas-liquid separation zone flashing off a light gaseous fraction; removing a clear substantially water stream from said gas-liquid separation zone and introducing said clear substantially water stream to said gas-scrubbing zone to scrub the effluent gas stream from the gas generator; cooling said light gaseous fraction and separating therefrom uncondensed light gases, water, and water soluble oxygen containing liquid organic compounds.

3. The process of claim 1 wherein additional fresh mixture of liquid organic by-products from said oxo process are introduced into the fractional distillation zone of step (3) as make-up.

4. The process of claim 1 wherein additional fresh mixture of liquid organic by-products from said oxo or oxyl process are mixed with said bottoms slurry from step (2) and introduced into the synthesis gas generator as a portion of the feed.

5. The process of claim 1 wherein the contacting of said carbon-water dispersion is effected in two stages including in the first stage the step of mixing said carbon-water dispersion with a sufficient amount of said liquid organic extractant such as about 1.5–10 lbs. of extractant per lb. of carbon so as to render all of said particulate carbon hydrophobic and to release, dry powdered carbon from said carbon-water dispersion, with said carbon rising to the surface of said water in said separating zone; and in the second stage introducing a stream of liquid organic extractant into said separating zone adjacent the water surface to float off said carbon from the surface of a bottom layer of said clarified water while forming said carbon-extractant dispersion containing about 0.5 to 5 weight percent carbon.

6. The process of claim 5 wherein the amount of liquid organic extractant mixed with the carbon-water dispersion in the first stage on a weight basis is about 1 to 3 times the Oil Absorption Number as determined by ASTM D281-31.

7. The process of claim 1 with the added steps of concentrating said carbon-extractant dispersion from step (1) in a centrifuging zone at a temperature in the range of about ambient to 700°F. and a pressure in the range of about 1 to 200 atmospheres prior to step (2).

8. The process of claim 1 wherein said liquid organic extractant is comprised 75 to 100 wt. percent of the liquid fraction up to 60 volume percent obtained by the fractional distillation in a Hempel flask and fractionating column per ASTM D285-62 of a mixture of said liquid organic by-products from the oxo or oxyl process, in admixture with 0 to 25 wt. percent of said light hydrocarbon fuel fraction.

9. The process of claim 8 wherein said liquid fraction obtained by the fractional distillation of the byproducts from the oxo or oxyl process is the fraction in the range of up to 10 volume percent and has an atmospheric boiling point in the range of about 192°–300°F.

10. The process of claim 1 wherein said liquid organic extractant introduced in (1) is in a total amount of about 10 to 200 times the weight of the particulate carbon in the carbon-water dispersion and is substantially insoluble in water.

11. The process of claim 1 wherein said liquid organic extractant comprises the following mixture:

| Group | Carbon Range | Wt. % |
|---|---|---|
| Alcohols | $C_3$ to $C_{16}$ | 2 to 75 |
| Esters | $C_6$ to $C_{2n}$ | 5 to 70 |
| Aldehydes | $C_3$ to $C_{16}$ | Nil to 25 |
| Ketones | $C_3$ to $C_{16}$ | Nil to 25 |
| Ethers | $C_6$ to $C_{2n}$ | Nil to 50 |
| Acids | $C_3$ to $C_{16}$ | Nil to 10 |
| Olefin | $C_5$ to $C_{15}$ | Nil to 30 |
| Saturated Hydrocarbons | $C_5$ to $C_{2n}$ | Nil to 50 |
| Water | | Nil to 15 |

12. The process of claim 11 wherein said liquid organic extractant comprises the following mixture:

| | Wt. % |
|---|---|
| Esters | 54 |
| Ethers | 20 |
| Aldehydes | 5 |
| Ketones | 5 |
| Acids | About 5 and below |
| Olefins | About 1 and below |
| Saturated hydrocarbons | About 1 and below |
| n-butyl alcohol | 3.4 |
| i-butyl alcohol | 0.6 |
| Alcohol ($C_5$–$C_n$) | 3.0 |
| Water | 2 |

13. The process of claim 12 wherein said liquid organic extractant comprises a cut comprising up to 10 volume percent when fractionated in a Hempel flask and Fractionating column per ASTM D285-62.

14. The process of claim 1 wherein water-soluble compounds have been removed by extraction from the liquid organic extractant introduced into step (1).

15. In a process for the production of gaseous mixtures comprising $H_2$ and $CO$ by the partial oxidation of a hydrocarbonaceous fuel or a slurry of solid carbonaceous fossil fuel with a free-oxygen containing gas in the reaction zone of the free-flow noncatalytic gas generator at a temperature in the range of about 1300° to 3500°F and a pressure in the range of about 1 to 300 atmospheres in the presence of a temperature moderator to produce an effluent gas stream comprising $H_2$ and $CO$ and containing entrained particulate carbon and at least one member of the group $CO_2$, $H_2O$, $CH_4$, $N_2$, A, COS, and $H_2S$, and from which said carbon particles are removed by scrubbing with water in a gas-scrubbing zone to produce a carbon-water dispersion the improved method of separating particulate carbon from said carbon-water dispersion which comprises:

1. contacting said carbon-water dispersion with a liquid organic extractant comprising a mixture of the liquid organic by-products from an oxo process having the following ultimate analysis in weight percent; carbon about 55 to 90, hydrogen about 5 to 17, and oxygen about 3 to 40 in admixture with 0 to 25 weight percent of light liquid hydrocarbon fuel, wherein the amount of liquid organic extractant added to said carbon-water dispersion is sufficient to render all of the carbon particles in said carbon-water dispersion hydrophobic and to resolve said carbon-water dispersion, and by decanting removing a stream of clarified water and a separate pumpable stream of carbon-extractant dispersion having a carbon content of about 0.5 to 5 weight percent in a separating zone at a temperature in the range of 180°–700°F and a sufficient pressure to maintain said liquid organic extractant and said clarified water in liquid phase;

2. introducing said carbon-extractant dispersion from said separating zone into a centrifuging zone at a temperature in the range of about ambient to 700°F and a pressure in the range of about 1 to 200 atmospheres, separately withdrawing from said centrifuging zone a thick centrifuge stream of carbon-extractant and a comparatively clean thin centrifuge stream of carbon-extractant; introducing said thin centrifuge stream into (1), after removing any waste gas, as at least a portion of said liquid organic extractant; recycling said clarified water to said gas-scrubbing zone to scrub carbon from the effluent gas stream leaving the gas generator; (3) introducing into a fractional distillation zone said thick centrifuge stream from (2) in admixture with about 0 to 25 weight percent of fresh mixture of liquid organic by-products from the oxo process and with liquid hydrocarbon fuel having a gravity in degrees API in the range of about −20 to 20 and in the amount of about 0.02 to 40 lbs. of fresh liquid hydrocarbon fuel per lb. of extractant in said thick centrifuge stream, removing a light fraction from said distillation zone and introducing same into (1) as at least a portion of said liquid organic extractant, removing a pumpable bottoms slurry containing said particulate carbon and the unvaporized portion of said mixture of the liquid organic by-products from the oxo process from said distillation zone, and introducing same into said gas generator as at least a portion of said fuel.

16. The process of claim 15 wherein the contacting of said carbon-water dispersion is effected in two stages including in the first stage the step of mixing said carbon-water dispersion with said liquid organic extractant in the amount of about 1–3 times the oil absorption No. of the particulate carbon in said carbon-water dispersion so as to render all of said particulate carbon hydrophobic and to release, dry powdered carbon from said carbon-water dispersion, with said carbon rising to the surface of said water in said separating zone; and in the second stage introducing a stream of liquid organic extractant into said separating zone adjacent the water surface to float off said carbon from the surface of a bottom layer of said clarified water while forming said carbon-extractant dispersion containing about 0.5 to 5 weight percent carbon in the total extractant.

17. In a process for the production of gaseous mixtures comprising $H_2$ and $CO$ by the partial oxidation of a hydrocarbonaceous fuel or a slurry of solid carbonaceous fossil fuel with a free-oxygen containing gas in the reaction zone of the free-flow noncatalytic gas generator at a temperature in the range of about 1300° to 3500°F and a pressure in the range of about 1 to 300 atmospheres in the presence of a temperature moderator to produce an effluent gas stream comprising $H_2$ and CO and containing entrained particulate carbon and at least one member of the group $CO_2$, $H_2O$, $CH_4$, $N_2$, A, COS, and $H_2S$, and from which said carbon particles are removed by scrubbing with water in a gas-scrubbing zone to produce a carbon-water dispersion the improved method of separating particulate carbon from said carbon-water dispersion which comprises:

1. contacting said carbon-water dispersion with a liquid organic extractant comprising a mixture of the liquid organic byproducts from an oxyl process having the following ultimate analysis in weight percent; carbon about 55 to 90, hydrogen about 5 to 17, and oxygen about 3 to 40 in admixture with 0 to 25 weight percent of light liquid hydrocarbon fuel, wherein the amount of liquid organic extractant added to said carbon-water dispersion is sufficient to render all of the carbon particles in said carbon-water dispersion hydrophobic and to resolve said carbon-water dispersion, and by decanting, removing a stream of clarified water and a separate pumpable stream of carbon-extractant dispersion having a carbon content of about 0.5 to 5 weight percent in a separating zone at a temperature in the range of 180°–700°F and a sufficient pressure to maintain said liquid organic extractant and said clarified water in liquid phase;
2. introducing said carbon-extractant dispersion from said separating zone into a centrifuging zone at a temperature in the range of about ambient to 700°F and a pressure in the range of about 1 to 200 atmospheres, separately withdrawing from said centrifuging zone a thick centrifuge stream of carbon-extractant and a comparatively clean thin centrifuge stream of carbon-extractant; introducing said thin centrifuge stream into (1), after removing any waste gas, as at least a portion of said liquid organic extractant; recycling said clarified water to said gas-scrubbing zone to scrub carbon from the effluent gas stream leaving the gas generator; (3) introducing into a fractional distillation zone said thick centrifuge stream from (2) in admixture with about 0 to 25 weight percent of fresh mixture of liquid by-products from the oxyl process, and with liquid hydrocarbon fuel having a gravity in degrees API in the range of about −20 to 20 and in the amount of about 0.02 to 40 lbs. of fresh liquid hydrocarbon fuel per lb. of extractant in said thick centrifuge stream, removing a light fraction from said distillation zone and introducing same into (1) as at least a portion of said liquid organic extractant, removing a pumpable bottoms slurry containing said particulate carbon and the unvaporized portion of said mixture of the liquid organic by-products from the oxyl process from said distillation zone, and introducing same into said gas generator as at least a portion of said fuel.

18. The process of claim 16 wherein the liquid organic extractant in said first stage, second stage or both stages is selected from the group consisting of said thin centrifuge stream, light liquid fraction from the distillation zone or mixtures thereof.

* * * * *